United States Patent [19]

Hoff

[11] Patent Number: 5,054,051

[45] Date of Patent: Oct. 1, 1991

[54] AUTODIAL FROM DATABASE IN AN ELECTRONIC WRISTWATCH

[75] Inventor: Don G. Hoff, Tiburon, Calif.

[73] Assignee: AT&E Corporation, San Francisco, Calif.

[21] Appl. No.: 472,999

[22] Filed: Jan. 31, 1990

[51] Int. Cl.⁵ ............................................. H04M 11/00
[52] U.S. Cl. ....................................... 379/56; 379/355
[58] Field of Search ...................... 379/56, 57, 61, 63, 379/90, 359, 355; 340/825.44

[56] References Cited

U.S. PATENT DOCUMENTS

| | | | |
|---|---|---|---|
| 4,130,738 | 12/1978 | Sandstedt | 379/355 |
| 4,320,387 | 3/1982 | Powell | 379/96 |
| 4,490,579 | 12/1984 | Godoshian | 379/354 |
| 4,644,352 | 2/1987 | Fujii | 340/825.44 |
| 4,713,808 | 12/1987 | Gaskill et al. | 370/94 |
| 4,847,818 | 7/1989 | Olsen | 379/90 |

FOREIGN PATENT DOCUMENTS

| | | | |
|---|---|---|---|
| 0051726 | 5/1982 | European Pat. Off. | 379/57 |
| 0187847 | 8/1988 | Japan | 379/58 |
| 0099333 | 4/1989 | Japan | 379/63 |

OTHER PUBLICATIONS

Maekline catalog excerpt, "Panasonic Cordless Phone", May 1988 (summer catalog), p. 7.

Primary Examiner—Jin F. Ng
Assistant Examiner—Dwayne D. Bost
Attorney, Agent, or Firm—Elmer W. Galbi

[57] ABSTRACT

A system and method to autodial a telephone number, employing (1) an electronic wristwatch which includes means for receiving radio paging messages and a memory for storing a database of predetermined multidigit telephone numbers and (2) a collapsible compact telephone handset, which does not have a dialing key pad. The electronic wristwatch and the handset includes short range transceivers so that a data communication link can be established between the electronic wristwatch and the handset. Circuitry is provided to transmit telephone numbers stored in or received by the electronic wristwatch to the telephone handset and to automatically dial such telephone numbers.

2 Claims, 5 Drawing Sheets

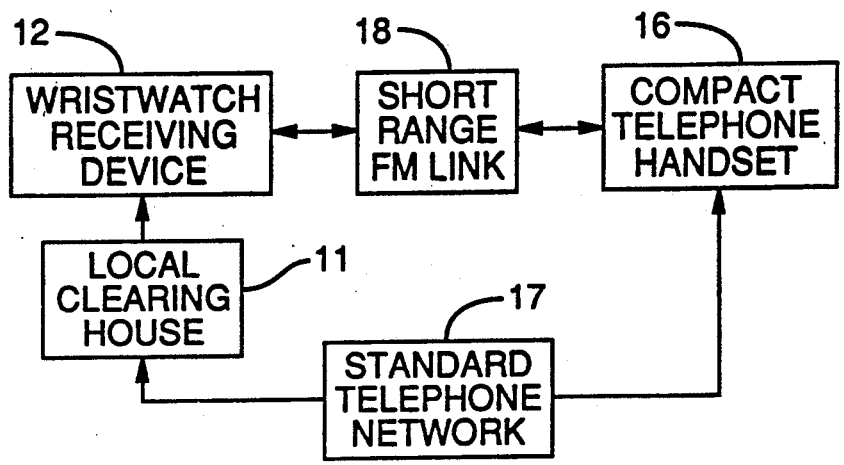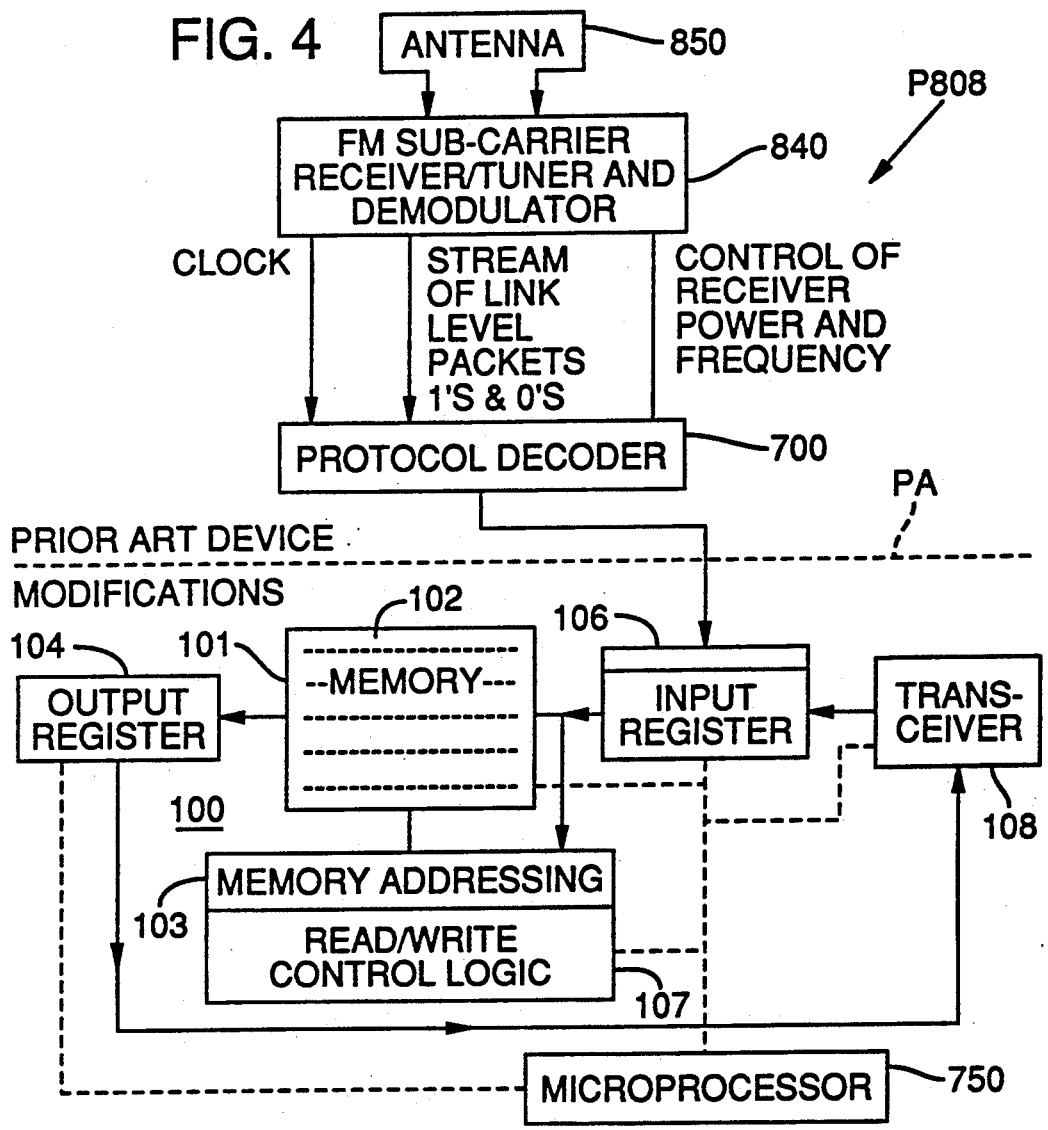

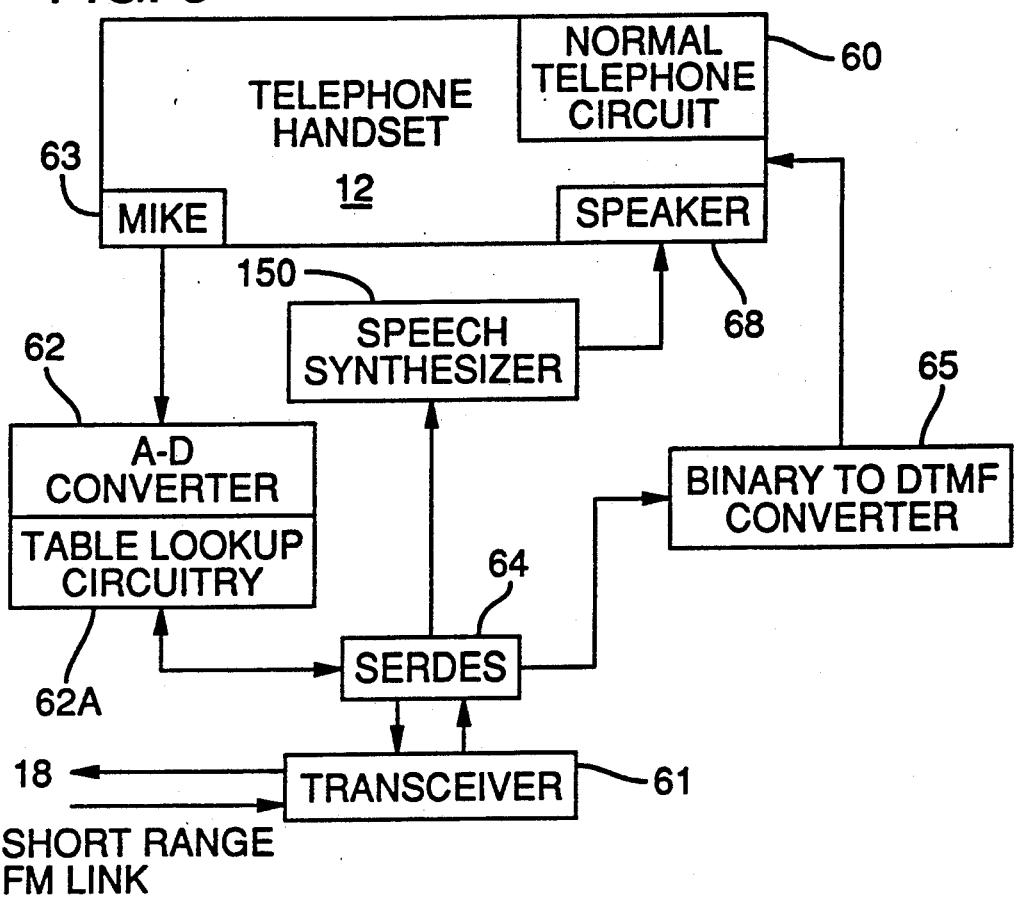
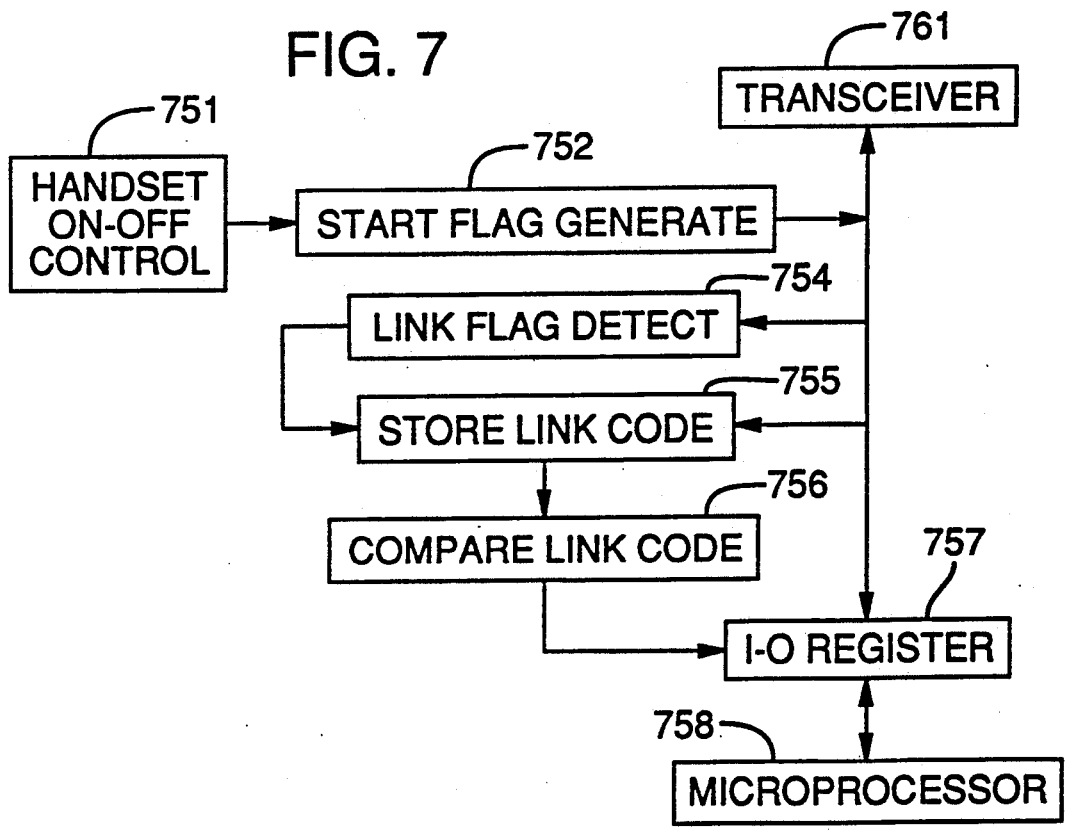

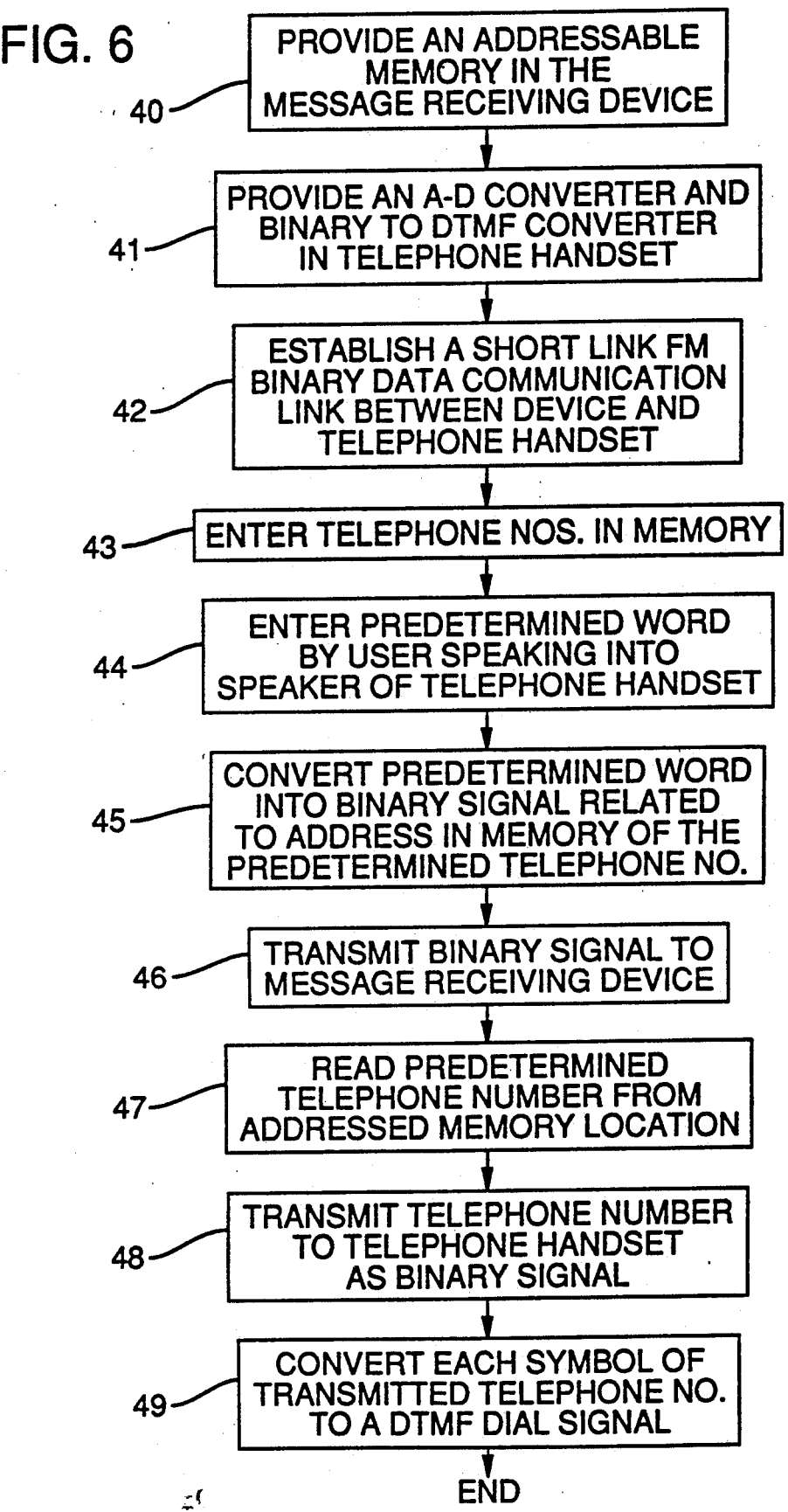

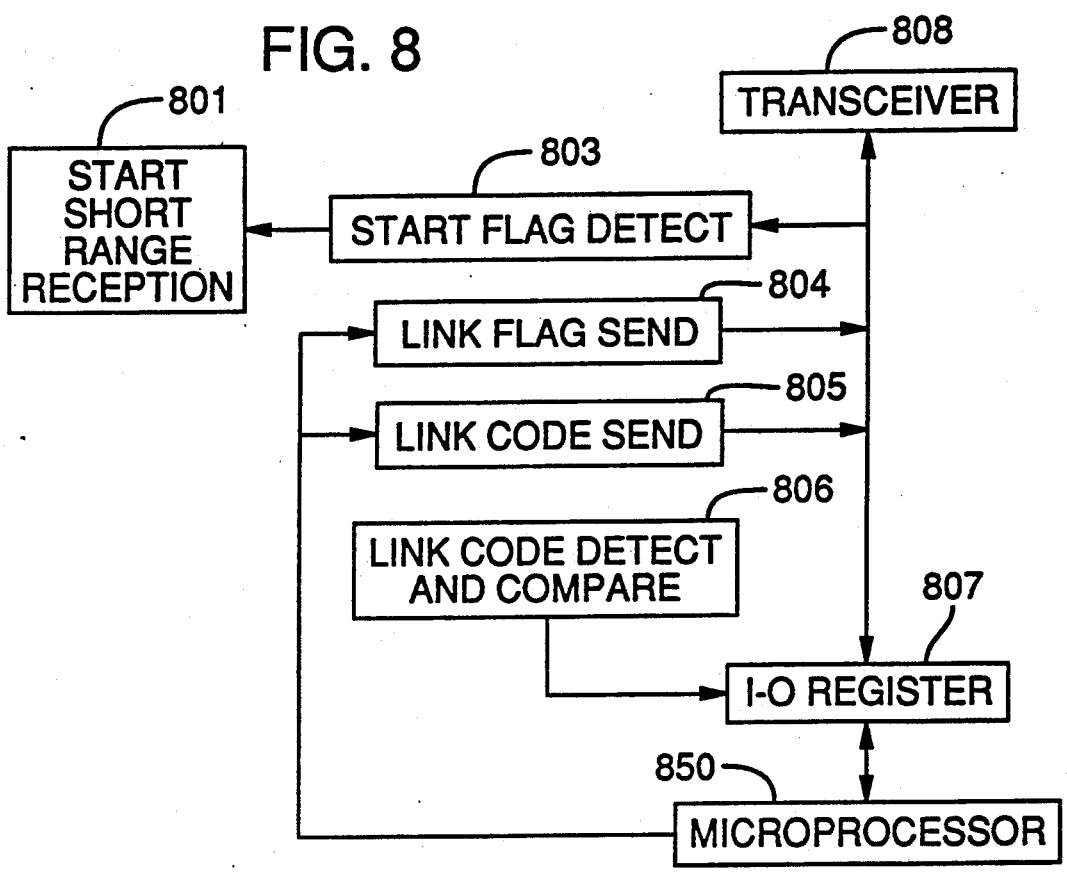
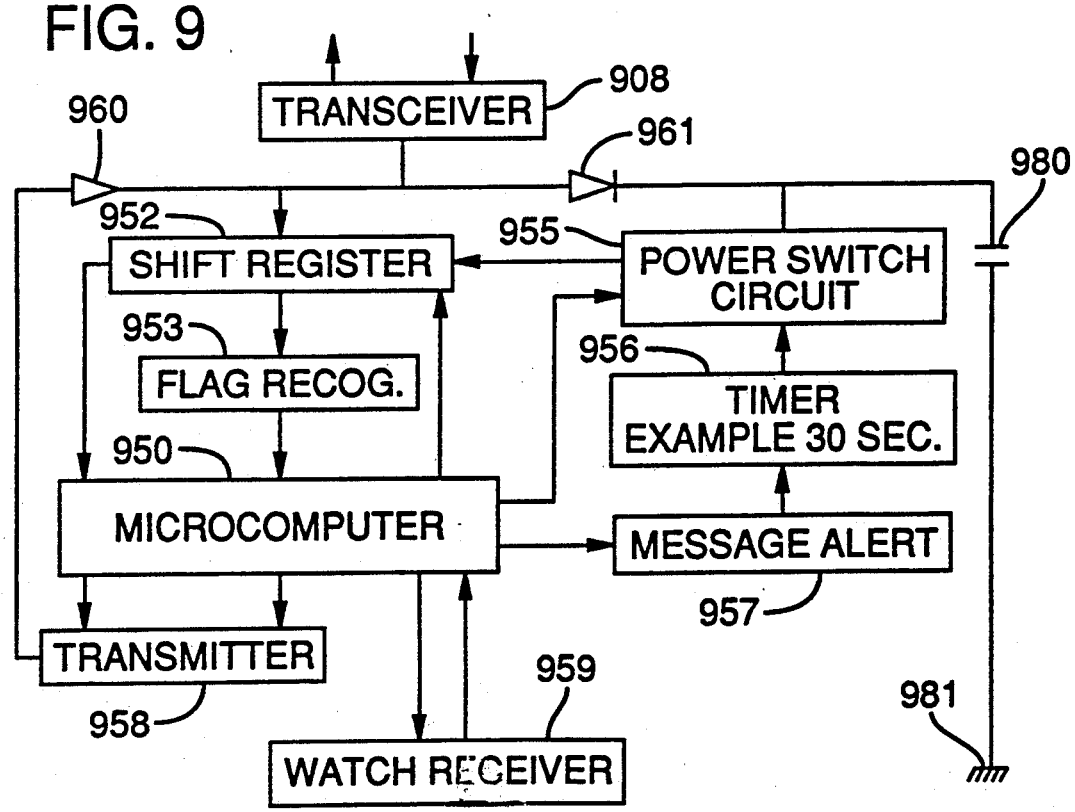

AUTODIAL FROM DATABASE IN AN ELECTRONIC WRISTWATCH

FIELD OF THE INVENTION

This invention relates to systems and methods to autodial telephone numbers and more particularly to a system and method for autodialing telephone numbers received via a radio transmission system or which are stored in a memory.

BACKGROUND OF THE INVENTION

Each subscriber in conventional telephone systems is assigned a seven digit telephone number, and a three digit area code. On an international basis, each country is assigned a country code and often a city code.

In order to place a long distance telephone call one must dial at least ten separate digits. International calls often require a minimum of fifteen digits. In some situations additional digits are required to connect to a specific long distance telephone company or in order to get an outside line. In order to avoid the inconvenience of dialing a long sequence of numbers a technique called "speed dialing" has been developed. Speed dialing allows a subscriber to set up a database in which a one or two digit code is assigned to each telephone number. By dialing the one or two digit code, the subscriber can in effect cause the phone to dial a much longer number that is stored in a database.

Speed dialing is currently implemented using a number of different approaches. Some "intelligent" telephone units currently available include a speed dialing function which stores a database of telephone numbers in the telephone unit. The database is addressed from either a set of dedicated speed dialing keys which are identified with specific numbers, or using special keys each of which is associated with a particular telephone number stored in the unit. An enhancement to the speed dialing technique is provided in some intelligent units which is referred to as voice dialing. In this enhancement, a microphone provides an analogue signal in response to the user speaking a predetermined word or sound. Circuitry in the telephone converts the analogue signal to a digital signal which is related to the address of the memory location where the corresponding telephone number is stored. The address so generated is used to read the telephone number from memory. After the number is read from the memory each of the digits is converted to the corresponding dual tone multi frequency (DTMF) dial signal normally employed by the telephone system.

As an alternative to using an intelligent telephone to implement speed dialing, in some situations the facilities of the central telephone switch can be used to implement speed dialing. Some telephone companies permit a subscriber to establish a telephone number database that is maintained by the telephone company. The customer is permitted to use the database for speed dialing and to modify the database, following certain protocols established by the company. This implementation is attractive to subscribers who do not have telephones with sufficient "intelligence" to dial previously stored numbers.

While speed dialing does facilitate the use of a telephone, some users may be in the situation of employing one database at home and another database at work. The two databases usually have at least some common numbers, but these common numbers are often assigned to different codes in the two databases. Speed dialing errors can occur because a user experiences confusion between the contents of the two databases. With the introduction of cellular (portable) telephones users who have speed dialing on their cellular telephone can be faced with the task of coping with three different databases which have various speed dialing codes.

There are existing prior art devices which can eliminate the need for a user to have multiple speed dialing databases; however, primarily due to human factor considerations such devices have not gained wide acceptance. The existing devices include portable battery operated autodialing devices which can store a database of telephone numbers and when activated by the user provide audible dial tone or DTMF dial signals. By placing the device adjacent the microphone of a standard telephone, the tone signals are transmitted through air into the telephone system and are recognized as conventional DTMF dial signals by the telephone circuits. Such a device in theory avoids many of the problems encountered by the telephone user who must cope with multiple databases since with such devices a user always operates with the same database. However, the existing devices have limitations imposed by human factor considerations and by the differences that exist among the various technologies used by different telephone installations and networks thus they have not achieved widespread acceptance and use.

Each telephone handset in a conventional hard wired telephone system is connected to the local switching exchange by telephone wires. Thus, each phone has a fixed location In order to accommodate people during periods when they are moving between fixed locations, two technologies have been developed, namely, radio paging and mobile or cellular telephones. The current state of the art in radio paging technology involves broadcasting a radio frequency signal to a number of subscribers who are in the range of the transmitter. Each subscriber has a battery operated device that includes a receiver and control circuitry which can identify when the transmitted signal is addressed to the particular subscriber. Some paging devices called "tone" pagers only provide the subscriber with an indication that he is being paged. The user then can respond by going to a telephone and calling a specified telephone number to receive the message, which is to call another number.

In more advanced pagers a small display is provided which can display a telephone number. In still more complex pagers actual messages are displayed, either in the form of icons which represent predetermined responses that the subscriber is requested to take, in actual text that is often abbreviated or cryptic, or in a voice message.

While paging devices do improve the capability of an individual to respond to telephone callers wanting telephone access to an individual who is not at a designated location, the individual who is paged is required to manually enter (i.e. dial) a telephone number in order to call back the person who placed the page. The present invention is directed to a system and method for enhancing the capability of the user of a radio pager to respond to a received message requesting the user to call a designated telephone number. Furthermore, the present invention provides for a personal speed dialing databa    the form factor of an electronic wristwatch.

SUMMARY OF THE INVENTION

The present invention provides a system for storing telephone numbers in a electronic wristwatch which is personal to a particular user. The numbers stored in the electronic wristwatch can be used to automatically dial telephone numbers. Telephone numbers can be sent to the electronic wristwatch via a radio paging system and a user can automatically dial a number that is sent to him over the radio paging system without re-dialing the number into a telephone system. The system of the present invention includes, a special telephone handset, an electronic wristwatch which can receive radio messages and which has a memory for storing a database of telephone numbers, and a short range communicating means for communicating from the wristwatch to the telephone handset. The telephone handset is collapsible to a size which allows it to be readily carried in the user's pocket.

With the present invention, when a telephone number is received over the radio paging device, the number is assigned a one or two digit message number and stored in the in the electronic wristwatch. The number received by the radio paging device can be retrieved and dialed automatically by speaking the message number into the microphone of the handset. Circuitry in the handset converts the spoken number into a binary number which represents the address in memory where the corresponding telephone number is stored. The binary number generated by the handset is transmitted over the FM link to the transceiver of the message receiving device where it is employed to address the memory location containing the telephone number. The telephone number is read from memory and transmitted to the transceiver in the handset unit through the FM link. As the signals are received at the handset, each symbol of the telephone number is converted into the appropriate DTMF dial tone signal employed by the normal telephone network.

The system also includes means for storing a series of frequently called numbers in the memory of the electronic wristwatch. These numbers can be recalled and dialed by speaking a one or two digit code number into the telephone handset.

The telephone handset which is part of the present invention is designed so that when the handset is opened to an extended position, (a) a microphone and a speaker are placed in the appropriate position for human factor considerations, (b) the handset's antenna is automatically extended to its correct length and (c) a short range FM link is established between the transceiver in the handset and the transceiver in the electronic wristwatch. Thus opening the handset starts a series of operations which facilitate autodialing a number received by the radio pager and stored in the memory of the radio pager.

The present invention provides a convenient means of dialing numbers sent to a user over a pager system or which are stored in a personal database. The division of functions between the handset and the electronic wristwatch are key to providing a readily usable unit which satisfies human factor needs.

The following is description of preferred embodiments which should be read in connection with the drawings described below.

BRIEF DESCRIPTION OF THE DRAWINGS

FIG. 2 is a block diagram illustrating functionally the electronic circuitry in the preferred embodiment of the invention.

FIG. 4 is a functional block diagram of electronic components of the message receiving device shown pictorially in FIG. 1.

FIG. 5 is a functional block diagram of electronic components of the telephone handset shown pictorially in FIGS. 3A-3C.

FIG. 6 is a flow chart illustrating the sequential steps involved in the preferred embodiment of the present invention.

FIGS. 7 and 8 are block diagrams of an additional feature.

FIG. 9 is a block diagram of an alternative embodiment of some of the circuitry.

DESCRIPTION OF THE PREFERRED EMBODIMENT

Figure 1:
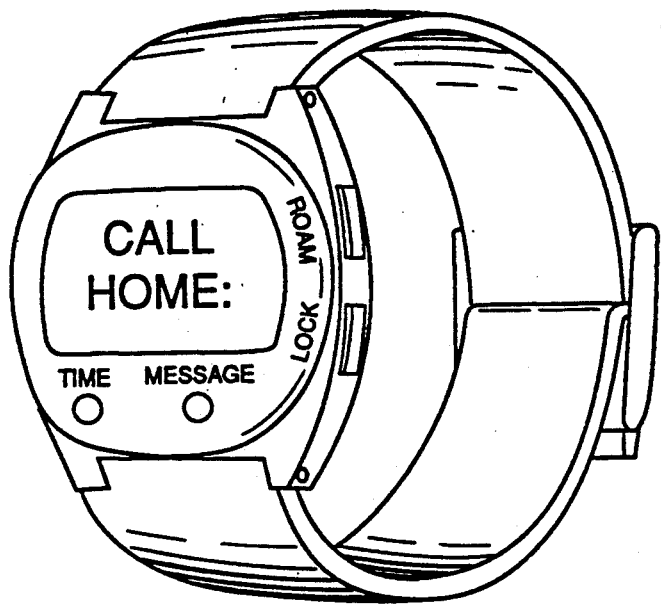
FIG. 1 is a pictorial representation of a preferred embodiment of the electronic wristwatch message receiving device which is part of the present invention.

FIGS. 1, 3A, 3B and 3C show the physical appearance of the preferred embodiment of the present invention. FIG. 2 shows in block diagram form the overall system including electronic wristwatch receiving device 12, short range FM link 18, compact telephone handset 16, local message clearinghouse 11, and a connection to the standard telephone network 17.

The preferred embodiment of the invention shown herein integrates the present invention with the wide area paging system of the type shown in U.S. Pat. No. 4,713,808 which issued on Dec. 15, 1987 and which is assigned to the assignee of the present invention. Block 11 in FIG. 2 represents a paging message clearinghouse of the type described in the above referenced patent. The general function of the clearinghouse is to arrange and format messages which are later transmitted to the paging receivers 12. Messages are sent to the electronic wristwatch message receivers 12 by radio transmitters employing the communication technology which is described in the above referenced patent. While only one device 12 is shown herein, it should be understood that a system would include many individually addressable receivers 12. For convenience of illustration only one is shown herein.

The wristwatch message receiver 12 functions to receive messages which pass through the clearinghouse 11 and which are broadcast by radio stations (not shown herein). The wristwatch message receiving device 12 corresponds in part to the device shown in the above referenced patent. For the purpose of the present description it can be assumed that messages that are broadcast request the user to return a telephone call to a telephone number specified in the message. With the present invention, the user can make contact with a number received by message receiving device 12 without having to dial the number into the telephone system.

Figure 3A:
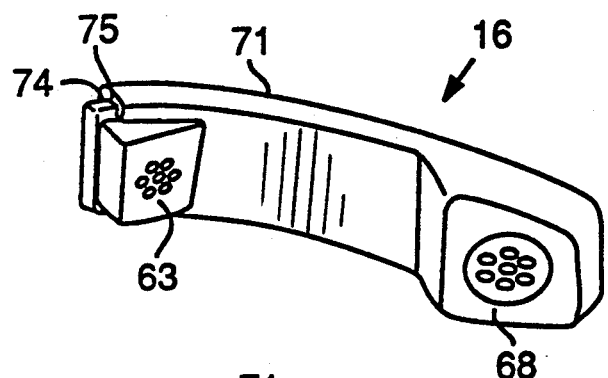
FIGS. 3A-3C are pictorial representations of the preferred embodiment of the telephone handset which is part of the present invention.
Figure 3B:
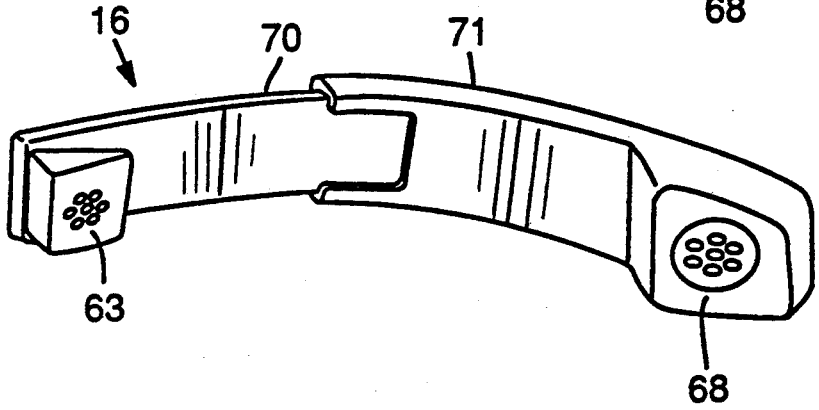
Figure 3C:
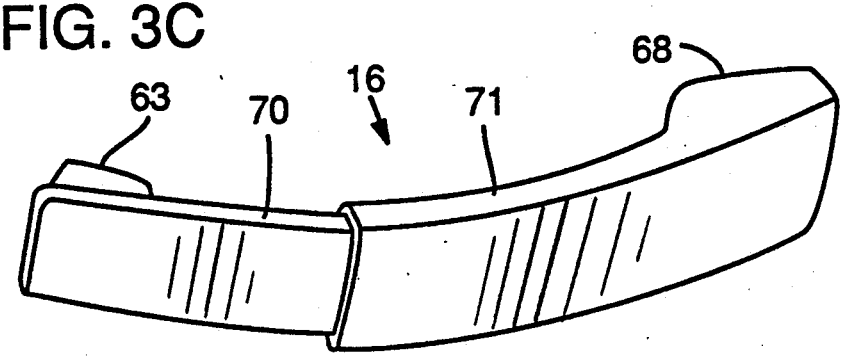

The telephone handset 16 is shown pictorially in FIGS. 3A-3C. Special circuitry in the telephone handset 16 is shown in FIG. 5 and it will be described below. The telephone handset 16 is a compact collapsible unit which can be readily ca  d in a user's pocket. Telephone handset 16 does not include a keypad for entering digits of the telephone number. Such a keypad is not needed with the present invention. With the present invention the unit 16 employs an autodialing approach when a telephone number is to be dialed. The telephone number to be dialed is stored in the memory of the message receiving device 12. The short range FM communication link provided between the message receiving device 12 and the compact telephone handset 16 transmits the number from the receiving unit 12 to the handset 16. This radio link includes a low power FM transceiver at each end of the link 18, capable of transmitting and receiving binary coded digital signals.

Telephone handset 16 performs two signal converting functions. First, words spoken into the microphone of the telephone handset 16 are converted into binary signals which identify locations in the memory of the message receiving device 12. Second, binary coded digits received from electronic wristwatch 12 are converted into traditional DTMF dialing signals.

The preferred embodiment of the telephone handset shown in FIGS. 3A to 3C comprises a two part telescoping casing consisting of a lower part 70 in which a microphone 63 is mounted and an upper part 71 in which the speaker 68 is mounted. The upper and lower parts are arranged with sets of interlocking grooves 74 and 75 extending lengthwise of the casings to permit the two parts to telescope. When the parts are extended, the microphone 63 and speaker 68 are spaced apart a distance corresponding to the spacing in a conventional handset.

The parts of the handset when collapsed are of a length to conveniently fit in a pocket of a garment worn by the user. The electronics circuits are disposed on a circuit board which is mounted in the lower shell portion 70. The upper shell portion 71 is hollow with a U-shaped cross section for most of its length. The handset antenna (not shown) is arranged so that it extends the full length of the outer casing when the phone is in use. This is achieved by mounting the antenna on the side edge of each casing portion so that as the casings are extended, the length of the antenna is approximately doubled.

FIG. 4 is a schematic diagram of the electronic circuitry in paging message receiving device 12 employed in the system of the present invention. The electronic wristwatch message receiving device shown in the previously referenced patent has been modified to include (a) the transceiver for short range communication link 18, (b) circuitry which permits a number received over the short range communication link from the telephone handset 16, to address the memory location of the device, (c) circuitry which enables the transfer of the contents of a memory location, (i.e. the telephone number corresponding to a spoken word) back to the transceiver for transmission to the telephone handset 16.

The components shown in FIG. 4 which corresponds to components described in the previously mentioned patent are labeled as prior art, designated by the number P808 and shown above the dotted line which is labeled PA. The normal operation of the unmodified message receiving device is not described in detail herein since a very detail description of the circuitry and protocol can be found in previously referenced U.S. Pat. No. 4,713,808 which is hereby incorporated herein by reference.

The modifications to the previous device needed for the present invention include provision of a random access semiconductor memory (RAM) sub system 100 which includes memory 101 having a plurality of addressable storage locations 102 for storing multidigit telephone numbers, suitable addressing circuitry 103, an output register 104 for storing a telephone number read from memory, an input register 106 for temporarily storing a telephone number that is being entered into memory 101 and control logic 107 which permits data to be entered and read from the memory. All the components shown are under control of a programmed microprocessor 750 in a conventional manner.

The input register 106 is connected to transceiver 108 which transfers information between message receiving device 12 and the telephone handset 16. Input register 106 can also receive messages from radio pager P808. Thus, telephone numbers can be stored in memory locations 102 under the control of the microcomputer 750 which are either (a) received from the telephone handset 16 via the transceiver 108 or (b) which come from clearinghouse 11 via pager P808. The output register 104 is connected to the transmitter portion of the transceiver 108 and has its input arranged to receive the telephone number read from memory 103.

The power source for the above described circuits is a battery. The battery and power connections have been omitted from the drawing for clarity. The power conservation aspects of the basic message receiving device can also be applied to the modifications to the extent that these devices only are powered on when they are required to perform their intended function.

FIG. 5 is a block diagram of the circuits employed in the compact handset telephone 16. Compact handset telephone 16 employs the conventional communication circuits of a standard handset telephone, except that the manual dial key pad has been omitted and circuitry has been added to (a) implement a transceiver 61 for establishing the short range FM link 18 with the message receiving device 12, and (b) for supporting the two signal converting functions discussed earlier. The handset 16 functions to support the normal communication channel between the telephone and the central switching office. These functions are conventional and are represented by block 60.

An analog to digital (A/D) converter 62 is shown connected to the microphone 63 of the telephone 16. A serilizer deserilizer (SERDES) 64 is disposed between the output of the A/D converter 62 and the transceiver 61. During an autodial operation, when a predetermined word is spoken into the microphone 63, it is converted to a multibit binary data signal which is temporarily stored in SERDES 64. The multibit binary data signal represents the address of the location 102 in memory 101 that stores the telephone number to be autodialed in response to that word. The A to D converter 62 includes a table lookup circuit 62A which correlates the pattern of a particular spoken message number to the address of the corresponding memory location 102. The transceiver 61 shifts the data through SERDES 64 as it transmits the data to the message receiving device 12 through the short range FM link 18. Telephone numbers that are transmitted to the handset 16 from the message receiving device 12 are placed in SERDES 64 by the receiver portion of transceiver 61.

A conventional speech synthesizer chip 150 is provided to articulate decimal numbers "0" to "9" in response to each symbol of the telephone number that is received at telephone 16 from wristwatch receiver 12. Chip 150 has its input connected to the output of serdes 64 and its output to the speaker or ear piece 68 of telephone 16. Chip 150 is not required for the operation of the device, but it does add to the ease of use.

A binary signal to DTMF signal converter 65 is connected from a second output 66 of SERDES 64 to the main transmitting circuits of the telephone 16 where DTMF signals are then sent to the telephone network. As previously described the telephone handset shown in FIG. 3 has a collapsible or telescoping multipart hard plastic outer shell, which is employed to house the electronic circuits described above in addition to a microphone 63, speaker 68, antenna (not shown), and battery (not shown).

The major steps comprising the method of the present invention are summarized in the flow chart of FIG. 6. It should be noted that the present invention includes both a new method and a new system. FIG. 6 describes the new method of the present invention. The method includes a number of steps which require the addition of designated functional modifications to specified prior art communication system components, which modifications create novel functional interrelationships among the communication system components that define the overall operational environment of the method.

The first recited step 40, as shown in FIG. 6, is to provide a memory in the message receiving device 12 for storing a database of telephone numbers.

The second step 41 calls for providing two specifically defined different signal conversion functions in the telephone handset 16. The third step 42 calls for establishing a short range communication link 18 between the telephone 16 and the device 12, which includes a pair of binary data transceivers. One transceiver is disposed in the device 12 to permit a first binary signal received from the telephone 16 to effectively address a location in memory so that a stored telephone number is read from memory and sent to the transceiver. The second transceiver is disposed in the telephone 16 so as to transmit the first binary signal to the device 12 after it has been converted from a predetermined word spoken into the telephone 16, by one of the signal conversion functions defined in the previous steps, and to receive the second binary signal from the message receiving device 12, which corresponds to the telephone number read out from memory.

The fourth major step 43 in the method calls for storing the telephone numbers into addressable locations in memory.

The fifth major step 44 is directed to actual autodial operation which involves speaking into the microphone of the telephone 16 a predetermined word that is associated with a known one of the telephone numbers stored in memory The sixth major step 45 specifies the step of converting the word into a first binary signal that is related to the address of the location in memory where the telephone number is stored. The seventh major step 46 transmits the first binary signal through link 18 to the message receiving device 12.

The eighth major step 47 involves reading the telephone number stored at the memory location corresponding to the first binary signal that was transmitted to the message receiving device 12.

The ninth major step 48 transmits the telephone number that was read from memory as a second binary signal to the telephone handset 16.

The tenth block 49 of the flow chart calls for the second binary signal to be converted so that each symbol of the received telephone number is converted to a corresponding DTMF dial signal.

The last step of the method (not shown in FIG. 6) is to send the sequence of DTMF signals through the handset link to the handset network where the voice connection is completed to the called party in accordance with the normal operation of the handset telephone network.

Various arrangements may be employed to initially establish the short range FM binary data transmission link 18 between the handset telephone 16 and the message receiving device 12 and to confirm that link 18 is operating. For example, a test button may be provided on the device 12 and telephone 16 to transmit a test signal which is converted to a test sound or tone in the telephone 16 and a display indication on the message receiving device 12.

Various arrangements may also be employed for "loading" the user's personal telephone database into memory 101. For example, an input jack may be provided to permit the data to be transferred from a device external to the system where the data is stored. Activation of the input jack would place the circuitry of the message receiving device 12 in a mode where the microcomputer would control such a transfer.

The normal message receiving capabilities of device 12 can be used to store numbers in memory 101. As described in the previously referenced patent each message received is numbered. This number can serve as the code for retrieving each number. As an added convenience, one memory location 102 can be reserved for storing a duplicate copy the last telephone number that is received by device 12. This last message can then be retrieved by a special code translated from the word "last message". Thus the last telephone number sent to the pager 12 can be retrieved by either saying "last message" or by giving its message number. In this way the user can very easily autodial the last number received.

Provision may be made in the handset telephone to provide feedback to the user other than the DTMF tones, which indicate that a number is being autodialed. For example, circuitry 150 can be provided to convert the DTMF tone to voice messages indicating the numbers being dialed. While the short link binary data transmission link 18 disclosed in the preferred embodiment is based on transmitting FM type radio signals, it will be apparent to those persons skilled in the art of transmitting binary data over short distances that an optical link employing, for example, infrared wavelengths may be readily substituted. It should be noted that transmitting the signals from the electronic wristwatch to the telephone handset using DTMF "sounds" would not provide the system with the advantages of the invention in that such sound transmission would not provide effective two way communication with the electronic wristwatch.

Circuitry which can be included in the electronic wristwatch and in the handset to insure that a particular electronic wristwatch is communicating with a particular handset is shown in FIGS. 7 and 8. FIG. 7 is circuitry in the handset and FIG. 8 is circuitry in the electronic wristwatch. When a particular handset is opened a mechanical switch (not shown) activates an on-off control circuit 751. This causes a flag generator circuit 752 to send a start flag to transceiver 761 (corresponding to transceiver 61) which transmits the flag to the electronic wristwatch. As will be explained in response to the start flag, the electronic wristwatch sends a link flag followed by a link code. Circuit 754 detects the link flag and then stores the link code in circuit 755. Each subsequent transmission from the electronic watch is preceded by the same link code. Received link codes are compared to the stored link code by circuit 756 and if there is a compare, the subsequent data is gated to I-O register 757 and sent to microprocessor 758 to perform the previously described functions.

FIG. 8 shows the circuitry in the electronic wristwatch that receives the start flag and that sends the link code. After a user has opened his telephone handset and thereby initiated the transmission of the start flags as previously described, one would push the start reception button 801. This would activate the transceiver 808 (corresponding to transceiver 108) and as a result a start flag would be detected by circuit 803. A link flag would be sent by circuit 804, followed by a link code from circuit 805. As the handset sends messages to the electronic wristwatch, each message is preceded by a link code. The link code is detected by circuit 806 and if there is a comparison the message goes to I-O register 807 and to microprocessor 850.

The coordination between the handset and the electronic wristwatch proceeds as follows:

1) When the handset is opened and activated it generates a particular sequence of bits (i.e. a flag sequence) which is recognized by circuit 803. This tells the electronic wristwatch that the handset is ready.

2) The electronic wristwatch then sends to the handset a flag followed by a link code. This link code is stored by the handset. Thereafter during the operating session which was initiated in step one, each time the handset sends a message to the electronic wristwatch the message is preceded by the link code. Likewise each time in the session that the electronic wristwatch sends a message to the handset, the message is preceded by the link code.

The above described "hand shake" operation insures that a particular electronic wristwatch is communicating with a particular handset. Naturally each electronic wristwatch must have a different link code.

While the invention has been disclosed in the context of the telephone database being stored in the memory of a battery powered message receiving device packaged in the form factor of a wristwatch, it should be understood that the disclosed system and method for autodialing does not require the device containing the memory to have the message receiving function nor necessarily to be packaged in the exact form factor of a wristwatch. The convenience to the user of a compact wrist mounted device is important from the standpoint of user acceptance and dictates many of the design features that are disclosed and shown in the preferred embodiment and modifications thereof.

An alternative embodiment for some of the circuitry in the electronic wristwatch is shown in FIG. 9. The circuitry shown in FIG. 9 is an alternative to the circuitry shown below the dotted line in FIG. 4. The circuitry in FIG. 9 has the advantage of operating in a special battery saving mode.

As shown in FIG. 9, the circuitry includes a transceiver 908 connected to an input shift register 952. The output of shift register 952 goes to flag recognition circuit 953 and to microprocessor 950. Power is controlled by power switch circuit 955 which is normally activated by timer 956, for example, every 30 seconds. The timer can also be activated by message alert circuit 957. A transmitter 958 sends signals to the handset under control of microprocessor 950. Diodes 960 and 961 insure that transmit and receive signals are properly routed. The circuitry for the normal watch and pager functions, (which is shown in the previously referenced patent) is indicated by block 959.

With this embodiment, when the electronic watch receives a page, the message alert circuit 957 can activate the circuitry to send a message to a handset and imitate a sequence which results in dialing the particular number. Otherwise the circuitry is normally in a low power state.

It can be activated every thirty seconds or so to determine if an handset is seeking to communicate.

Modifications and changes in the various details of the present invention, other than those mentioned above, that are obvious from the above description and do not depart from the spirit of the invention come within the scope of one or more of the following claims.

What is claimed is:

1. A telephone dialing system comprising in combination:
   an electronic wristwatch and a telephone handset,
   said electronic wristwatch including,
      first radio means, said first radio means comprising a one way radio means for receiving radio paging messages which include telephone numbers,
      second radio means, said second radio means comprising a two way short range radio link between said electronic wristwatch and said telephone handset,
      means for storing telephone numbers, and
      means for retrieving telephone numbers from said memory and transmitting said telephone numbers to said telephone handset using said second radio means,
   said telephone handset including
      means for receiving messages electromagnetically transmitted from said electronic wristwatch using said second radio means,
      means for generating DTMF dialing tones from the numbers so received and
      means for transmitting to said wristwatch requests to retrieve and send to said telephone handset a number stored in said memory,
   whereby numbers received via said first radio means and stored by said electronic wristwatch can be automatically transmitted to said telephone by said second radio means and automatically dialed by said telephone.

2. In a system that includes a telephone handset which has a two way short range radio transceiver, and a wrist mounted device which has a radio paging receiver and a two way short range radio transceiver, a method to autodial a predetermined telephone number stored in said writs mounted radio receiving deice, from said telephone handset in response to said user entering into said telephone handset a predetermined voiced sound that is unique to said predetermined number, comprising the following steps in combination,
   A) providing in said wrist mounted device a memory having a plurality of addressable storage locations,
   B) establishing a communication link between said device and said telephone,
   C) a transmitting through said link a first signal to said device from said telephone in response to said user entering into said telephone said predetermined sound, D) converting in said device said first signal when received into the address in said memory of said storage location associated exclusively with said predetermined number,
E) transmitting from said device through said link to said telephone a second signal corresponding to said predetermined number from said storage location associated with said predetermined number, and
F) converting in said telephone each symbol of said multisymbol number received from said device into a dial signal for transmission to a central switching unit to which said telephone unit is assigned.

* * * * *